United States Patent [19]
Feezor

[11] Patent Number: 5,876,872
[45] Date of Patent: Mar. 2, 1999

[54] UNDERWATER RECHARGEABLE BATTERY AND METHOD OF MANUFACTURE

[76] Inventor: Michael D. Feezor, 1110 East Franklin St., Chapel Hill, N.C. 27514

[21] Appl. No.: 745,682

[22] Filed: Nov. 8, 1996

[51] Int. Cl.⁶ .................................................... H01M 6/14

[52] U.S. Cl. ............................................................ 429/118

[58] Field of Search .................................. 429/6, 72, 73, 429/119

[56] References Cited

U.S. PATENT DOCUMENTS

| | | | |
|---|---|---|---|
| 4,190,062 | 2/1980 | McCartney et al. | 429/6 |
| 5,525,442 | 6/1996 | Shuster | 429/194 |

OTHER PUBLICATIONS

IEEE Council on Oceanic Engineering Conference Record, Oceans 82, Sep. 20–22, 1982, pp. 50–56 as referred to in application on p. 4, lines 5 and 6. (month N/A).

*Primary Examiner*—M. Nuzzolillo
*Attorney, Agent, or Firm*—Olive & Olive, P.A.

[57] ABSTRACT

The battery of the invention includes at least one electrochemical cell for use and recharging underwater, particularly seawater, at a pressure at or greater than atmospheric pressure. The battery has an anode, a cathode, an associated electrolyte in a housing, and a pressure compensation fluid which has a density greater than water, but preferably between the density of water and the density of the electrolyte. Preferably the pressure compensation fluid has a density of about 1.2 g/cm³, and is non-conductive. Apparatus to compensate for changes in volume are provided, as are components for the escape of internally generated gases.

27 Claims, 6 Drawing Sheets

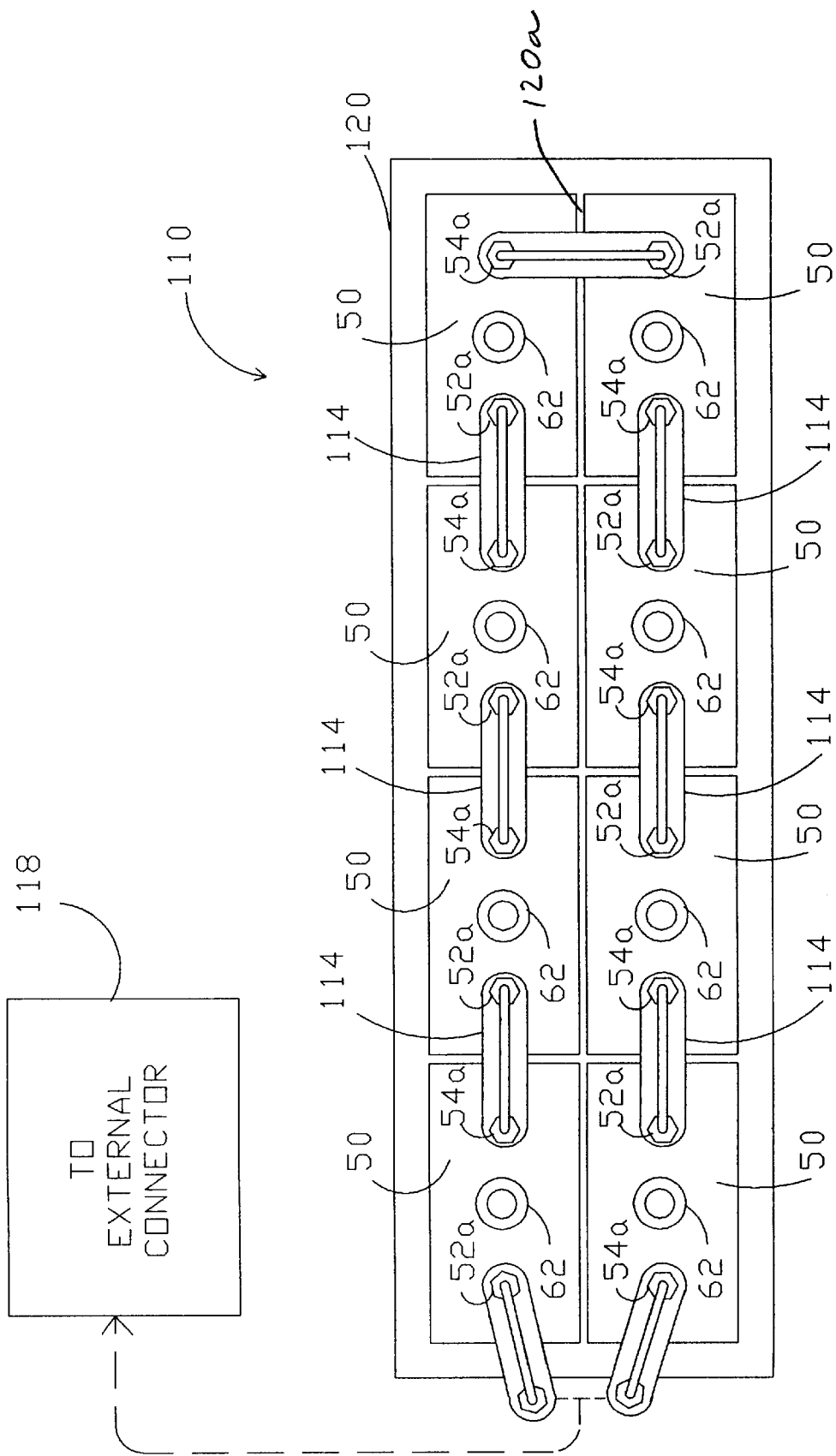

UNDERWATER RECHARGEABLE BATTERY AND METHOD OF MANUFACTURE

BACKGROUND OF THE INVENTION

1. Field of the Invention

This invention relates to electrical storage batteries, and in particular, relates to such batteries which may be safely used and recharged underwater, or which may be used in conditions subject to accidental flooding with water.

2. Description of the Related Art

Underwater vehicles, many of them relatively small and in the range of about eight feet long, are used for military, industrial and research purposes. Researchers often use underwater vehicles, mainly powered submarine boats and bathyspheres, under the ice, for example, to study ice mechanics and thickness, water thermoclines, electrical conductivity of water, and global warming. Batteries are often utilized as the electrical power source for the vehicles themselves as well as for various instruments in the vehicles, as disclosed, for example in, U.S. Pat. No. 5,379,714 of Lewis et al. The disclosure of the '714 patent and other patents and publications hereafter referred to are deemed incorporated herein by reference.

As used herein, the term battery means a single or multiple cell device for supplying electrical current by the electrochemical action of a wet or dry electrolyte and a pair of dissimilar electrodes. Because the batteries in the described vehicles are used in an underwater environment, even though they are typically enclosed and separated from the water in which the vehicles are used, particular problems can and do arise due to the underwater location. For example, such batteries may need to withstand high pressure exposure, rapid pressure change and temperature changes. It is also important that the battery be protected from entrance of seawater into any sensitive portions of the battery. The battery is also required to function in different orientations due to the vehicle's pitching and rolling, which can cause a battery to become inverted.

Rechargeable batteries are particularly useful for vehicles which must operate repetitively, and for vehicles which are unattended for extended periods of time for reasons of economy and convenience. Although batteries have been developed to meet the criteria discussed above, batteries known in the art are not safely rechargeable underwater, and must be brought to the surface to be recharged. Alternatively, replacement batteries, as opposed to rechargeable batteries, must be provided.

Gas release must also be accommodated in the design and use of a battery system. Few rechargeable cell type batteries are completely gas free, but considerable effort has been invested in cell design to minimize this problem. In particular, lead-acid cells have been characterized as giving rise to substantial amounts of gases during charge and particularly during overcharge, due to electrolysis of water and side reactions of the positive grid material with the electrolyte.

Currently available rechargeable batteries typically use a water-based chemistry. While charging, these batteries produce some hydrogen and/or oxygen due to electrolysis of the water. Upon overcharge, virtually all of the excess electrical energy applied to the battery produces these gases, either as H and O, or as $H_2$ and $O_2$. Some chemistries, e.g. nickel-cadmium, when overcharged at ordinary temperatures, catalyze and effectively recombine most of the evolved gases back into water, with the production of heat which causes the battery temperature to rise abruptly at the end of the charge. This temperature rise is often used to detect and terminate the charge phase. The charge is terminated once a certain maximum temperature is achieved, or upon a temperature rise, or indirectly through the effect of the rising temperature on the battery terminal voltage reflected by a decrease in voltage. At temperatures below 10° C., this catalysis is reduced in efficiency and may allow increased hydrogen and oxygen evolution.

Hydrogen is explosive when mixed with oxygen over a very wide range of concentrations from about 4% to about 92% hydrogen. However, no charging strategy presently known, when used for hundreds or thousands of recharge cycles, can with absolute assurance prevent a critical amount of hydrogen and oxygen from being evolved so as to prevent a resulting explosive atmosphere. Only about 18 grams of water need be electrolyzed to result in 22.4 liters of hydrogen and 11.2 liters of oxygen at Standard Temperature and Pressure (STP) of 0° C. and 760 mmHg. A single lead-acid, silver-zinc, or nickel-cadmium battery used in an underwater vehicle will typically contain hundreds of times this amount of water. Thus, charging of a battery in a closed container is not recommended or safe. Almost all manufacturers include a warning about this danger with their particular battery, in spite of claims that batteries do not evolve gas. Certain hydrogen-absorbing materials exist, but their efficacy at low temperatures is greatly reduced, and they do not remove the weight penalty imposed by the pressure housing required.

Batteries are sometimes placed in a pressure resistant housing in order to keep them dry. The pressure resistant housing imposes a severe weight penalty on portable underwater equipment and vehicles, particularly for submarine like vehicles designed for deep ocean use. The extreme pressures encountered in such environments mandate spherical or cylindrical housings with thick walls. The shape of these housings does not lend itself to efficient utilization by the battery shapes typically available. FIG. 1 is a diagram of a typical aqueous electrolyte rechargeable cell of a type which must be placed in a pressure resistant housing for underwater use.

Adapting batteries to be used under water "at depth" (a term which typically refers to pressures greater than atmospheric pressure) without a pressure resistant housing is called pressure compensation. Pressure compensation has been accomplished in the past by replacing spaces in the batteries which would normally contain air or gas, with a light mineral oil to keep out external water and keep the electrolyte from being lost or diluted. This has been done by Deep Sea Power and Light Co., Whittaker-Yardney Corp., and perhaps others, using lead-acid and silver-zinc batteries (see FIG. 2). According to the manufacturer, these batteries cannot be charged at depth—only at the surface. An oil-filled pressure-compensated battery system using a silver-zinc electrode system has been developed by Industrial Battery Plant, Japan Storage Battery Co., Ltd. as described in Oceans 82, Proceedings of Conference Sponsored by Marine Technology Society, IEEE Council on Oceanic Engineering, Washington, D.C., 1982, pages 50–56. The battery and connector boxes of this system are liquid tight and are filled with an oil having a density less than water, i.e. 0.80 to 0.88 g/cm³. Each cell is exposed to the box through a gas/liquid separator. Oil moves through conduits to equilibrate pressure, and a bladder is said to compensate the volume changes of gas, electrolyte and oil which are expected at submarine temperatures and pressures. Relief valves at the top of the box vent gas to the sea when the pressure rises in the system.

Other pressure compensation systems which use other light oils as the compensation fluid, when charged at increased pressure under water, eventually lose compensation oil due to the displacement of the oil by gas evolution. Gas evolution occurs primarily while the battery is being charged, and becomes rapid during overcharging. The gas evolution is due to the electrolytic decomposition of water 2 $H_2 \rightarrow 2H_2 + O_2$. These gases (hydrogen and oxygen) may be initially produced in nascent form as H and O, and, at room temperature or above, may partially recombine harmlessly in certain battery systems. Recombination yields water and heat. However, as the above chemical equation indicates, two mols of water (36 grams or about 1.3 ounces), when electrolyzed, yields 2 mols of $H_2$ and 1 mol of $O_2$, totaling 3 mols of evolved gas. These 3 mols of evolved gas will amount to approximately 67.2 liters at STP. Such an amount is enough to displace an enormous amount of compensation fluid. Particularly upon subsequent descent to a greater depth, the lighter oils will be replaced by the heavier ambient water (density 1.0 g/cm$^3$ to 1.04 g/cm$^3$), which may intrude and replace the lost oil and gas, thus poisoning the battery system.

Under unusual circumstances such as catastrophic failure resulting in loss of compensating fluid (perhaps due to fracture or melting of the battery housing) losing the lighter-than-water compensating fluids causes the submarine vehicle to lose buoyancy. Loss of buoyancy may cause the submarine to descend uncontrollably. The submarine may then be destroyed due to crushing of the hull under extreme pressure, or may be difficult or impossible to recover due to extreme depth.

In addition, battery system vents are often used to provide repeated relief of a pressure condition within a battery. See, for example, the battery vent plug of Szymborski et al. (U.S. Pat. No. 4,328,290) which is arranged to prevent dropping of the internal pressure to zero upon venting while yet having a small relief-reseal pressure range, and Spillman et al. (U.S. Pat. No. 5,360,678) in which pressure compensation means may comprise bellows used together with vents.

It is therefore an object of this invention to provide a method of pressure-compensating a submersible battery which permits safe recharging at depth.

It is a further object of this invention to provide a heavier compensation fluid which remains properly partitioned thereby displacing the relatively lighter ambient water, and effectively preventing its intrusion into the cell electrolyte.

It is a further object of this invention to provide a battery which, if battery cell failure occurs, will not result in loss of buoyancy of the submarine or other type vehicle holding the battery.

Other objects and advantages will be more fully apparent from the following disclosure and appended claims.

SUMMARY OF THE INVENTION

The invention herein comprises a battery which is safely rechargeable underwater, and a method for making this battery. The battery comprises an electrochemical cell for use individually or in a multi-cell group in water at a pressure at or greater than atmospheric pressure. A preferred pressure compensation fluid has a density of about 1.2 g/cm$^3$ so as to be between the density of water and the density of the electrolyte (about 1.4 g/cm$^3$ for the commonly used KOH electrolyte) and is electrically non-conductive. While the invention is useful in seawater or fresh water, application in seawater is more common. Seawater can vary in density from 1.02 g/cm$^3$ to 1.04 g/cm$^3$, and is typically 1.03 g/cm$^3$. The invention works equally well in all seawater densities. Other preferable characteristics of the pressure compensation fluid are indicated herein. In a preferred embodiment, the pressure compensation fluid appears within the battery housing. In a second embodiment, multiple cells are combined in a case filled with the pressure compensation fluid, but this embodiment is less tolerant of inversion.

Other aspects and features of the invention will be more fully apparent from the following disclosure and appended claims.

BRIEF DESCRIPTION OF THE DRAWINGS

FIG. 7 is a top plan view of the multiple cell system of FIG. 6.

DETAILED DESCRIPTION OF THE INVENTION AND PREFERRED EMBODIMENTS THEREOF

Structurally the battery of the invention is constructed substantially similar to existing batteries, such as the underwater battery previously referred to of Whittaker-Yardney Corp. Therefore, the description of the invention will refer generally to the schematic representations of such batteries, and will not contain a detailed description of the construction of the batteries. Any difference in the construction of the batteries are noted.

Figure 1:
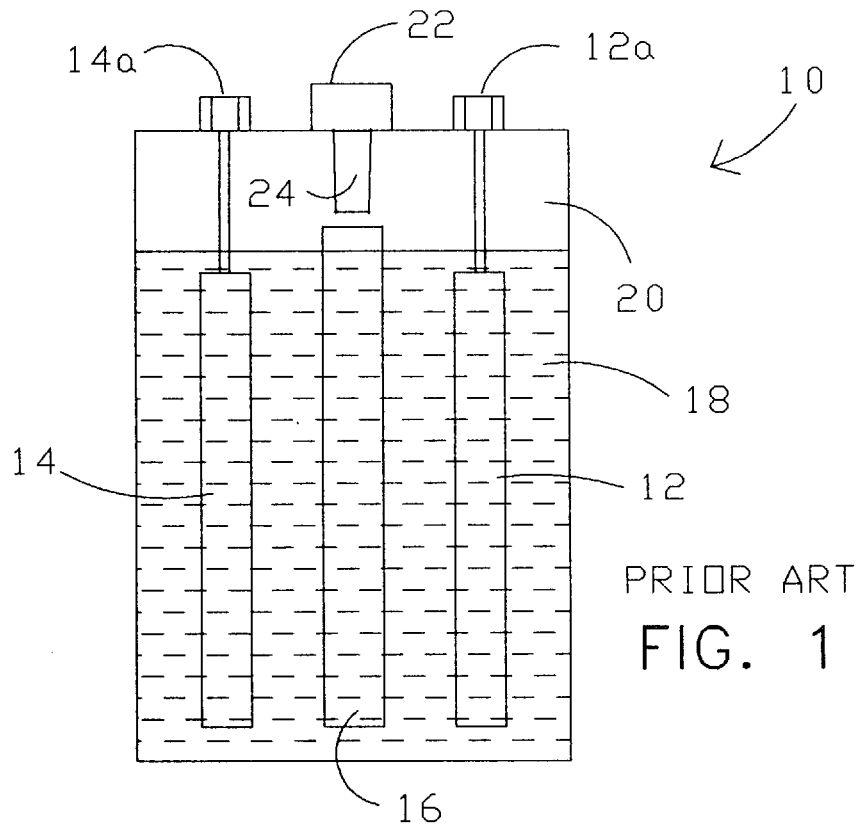
FIG. 1 is a schematic drawing of a prior art non-pressure compensated aqueous electrolyte battery.

A schematic representation of a typical prior art aqueous electrolyte non-pressure compensated rechargeable battery is shown in FIG. 1. Battery 10 comprises anode 12, corresponding terminal 12(a), cathode 14, corresponding terminal 14(a), and separator 16 in electrolyte 18. Layer 20, in a typical battery, is ambient air or gas which evolves during battery charging and, to a lesser degree, during use. A typical battery also comprises pressure relief seal 22 and anti-spill tube 24.

Figure 2:
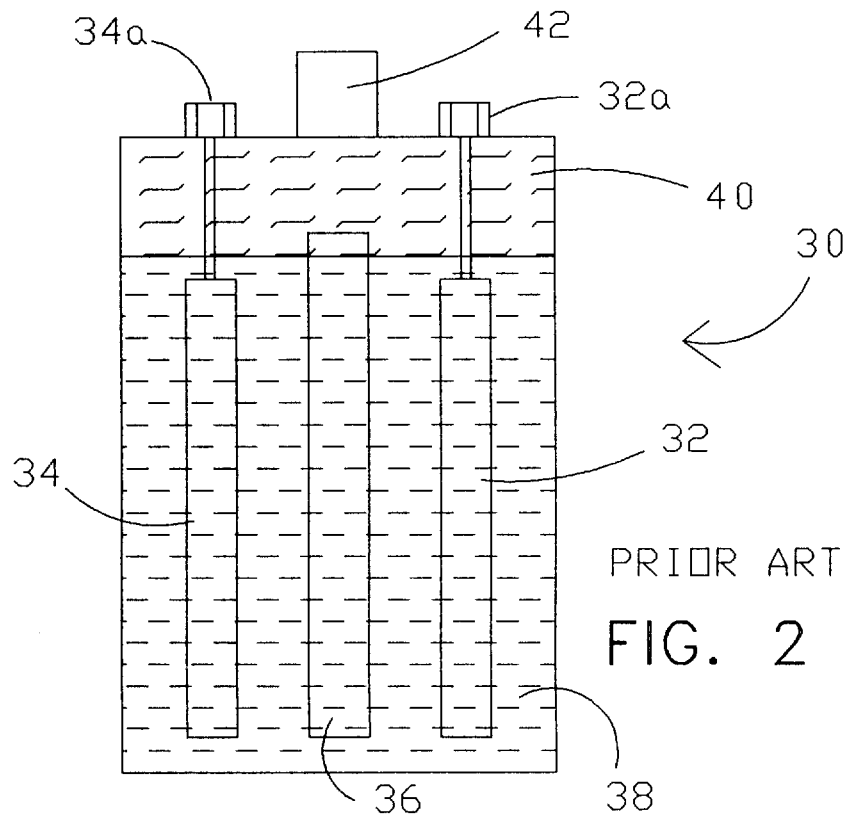
FIG. 2 is a schematic drawing of a prior art battery with a pressure compensation liquid included.

A schematic representation of a typical, prior art pressure-compensated battery is shown in FIG. 2. Battery 30 comprises anode 32, corresponding terminal 32(a), cathode 34, corresponding terminal 34(a), separator 36 in electrolyte 38 and a pressure relief seal 42. Pressure-compensation fluid 40 typically floats on electrolyte 38 and prevents electrolyte 38 from being lost or diluted and keeps external water from contaminating electrolyte 38. A typical pressure-compensated battery utilizes a light mineral oil as pressure-compensation fluid 40.

The present invention provides a battery which, instead of light mineral oil, utilizes a pressure compensation fluid having a density greater than seawater, and preferably a fluid having a density substantially midway between the density of the battery electrolyte being used and that of seawater. These criteria work best for the class of batteries which have a dense electrolyte—notably a silver-zinc electrode-type battery (such as made by the Yardney Corp., Whittaker-Yardney Power Systems, Division of Whittaker Technical Products, Inc., Pawcatuck, Conn.) or conventional liquid-electrolyte acid batteries (such as made by SAFT America, 711 Industrial Boulevard, Valdosta, Ga. and others).

Wet-cell batteries for underwater use typically contain a concentrated potassium hydroxide (KOH) electrolyte having a density of approximately 1.4 $g/cm^3$. Since water has a density of 0.9998 $g/cm^3$ at 0° C. and seawater has a density of 1.02 $g/cm^3$ to 1.04 $g/cm^3$, a fluid having a density of about 1.2 $g/cm^3$ is substantially midway between and accomplishes a partitioning between the sea (or fresh) water and the electrolyte. Essentially, the chosen pressure compensation fluid forms a layer on top of the electrolyte, and upon which the water would float, if a leak occurred.

Figure 3:
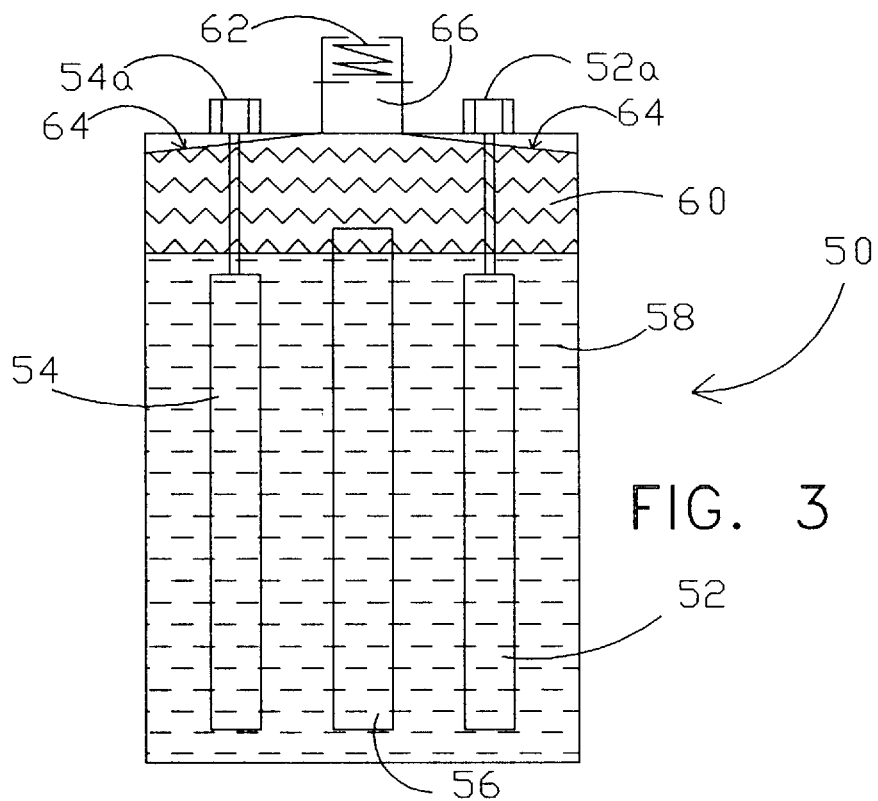
FIG. 3 is a schematic drawing of the battery of the invention.

FIG. 3 represents a schematic view of a preferred embodiment of the invention. Cell 50 comprises anode 52, corresponding terminal 52(a), cathode 54, corresponding terminal 54(a), and separator 56 in electrolyte 58. Pressure-compensation fluid 60, the chosen type of which is unique to the invention, floats on electrolyte 58. A slanted interior top surface 64 is provided to eliminate the right angle existing in the top corners of a typical battery and where gas bubbles are often trapped. Gas bubbles produced during charging of the battery of the invention pass through the compensation fluid and out through pressure relief valve 66 into the ambient water.

The pressure compensation fluid should be selected according to the following preferred specifications:

1. A density of substantially 1.2 $g/cm^3$ is preferred for a KOH electrolyte or similar type battery. Liquids having greater density can be diluted to a density of 1.2 $g/cm^3$ by addition of a miscible fluid having a density of less than 1.2 $g/cm^3$.
2. A density equal to or greater than that of the electrolyte is preferred for a starved electrolyte lead-acid battery (which utilizes a minimal amount of electrolyte held in a wick between the electrodes). It is to be noted that the pressure compensation fluid of the present invention will always be heavier than seawater, or whatever fluid constitutes the external medium.
3. The fluid must be non-ionic/non-conductive so as to not constitute an electrical path which would short circuit the battery or cause appreciable electrical leakage.
4. Non-reactive in strong non-oxidizing bases (for example as in a battery using silver-zinc, nickel-cadmium, or nickel-iron electrodes, and using a strong alkali electrolyte such as KOH).
5. Non-reactive in strong non-oxidizing acids such as $H_2SO_4$ (used in a lead-acid battery and the like).
6. Non-volatile. This property is not strictly required, but is desirable so that the fluid will not be lost due to evaporation during long storage or at elevated temperatures. Liquids having a boiling point of 200° C. or higher should have a suitably low vapor pressure.
7. Low melting point. The melting point should be lower than the lowest temperature at which charging will be undertaken. For ocean deployment, −10° C. to −20° C. is a suitable range.
8. Insoluble and immiscible in water.
9. Insoluble in the battery electrolyte used. (Some batteries such as lithium ion batteries use solid electrolytes, organic electrolytes, and/or thionyl chloride).
10. The fluid must not dissolve the battery case or other battery components. This property might entail changes in the materials of which the battery is constructed. Cases and other battery components used are often constructed of polypropylene or other polymers which are highly resistant to solvents and chemical action.

The following properties are desirable for a pressure compensation fluid, but not required:

1. Non-toxic, environmentally friendly, non-flammable, non-corrosive.
2. Low gas solubility. Any excess gas that dissolves in the fluid will evolve, perhaps rapidly, when the battery is decompressed.
3. Non-foaming, for example, when bubbles pass through the liquid.

As shown in Table I below, one class of liquid meeting the requirements set forth above is chlorinated hydrocarbons having higher degrees of chlorine substitution, such as 1,1,1,3,3,3-Hexachloropropane and 1,2,2,3-Tetrachlorobutane. These hydrocarbons meet most of the specifications listed above. The densities of these hydrocarbons are higher than required, but they may be diluted with a suitable lighter chlorinated hydrocarbon, a light mineral oil, or a silicone oil.

Another compound is α-chloronaphthalene, which, unlike hexachoropropane and tetra-cholorobutane, is flammable. Flammability is not however a major consideration for fluids having low vapor pressure (high boiling points). Flammability could however exacerbate an accident that might happen at high temperatures. The utility of these compounds, of course, as stated above, also depends on the compatibility with respect to the desired battery components.

Other possible fluids suitable for use as a pressure-compensation fluid according to the invention include fluorocarbon polymers, such as a fluorocarbon polymer offered under the tradename Fluorolube FS-5 of Occidental Chemical Co. of Dallas, Tex.; trifluoropropyl-methyl polysiloxane offered under the designation FS 1265 by Dow Corning Corporation of Midland, Mich.; as perfluoro-polyether offered under the tradename Fomblin 16/6 of Ausimont/Montedison of Italy. Such fluorocarbon polymers are used as lubricants in high temperature and corrosive environments. These compounds have densities in the range of about 1.5 $g/cm^3$ to 1.8 $g/cm^3$, and are thus too heavy to be used alone in KOH or $H_2SO_4$ electrolyte batteries. These fluorocarbon polymers are insoluble in water as well as in the usual organic solvents. They are therefore difficult to dilute to lower densities. They are deemed useful, however, according to the invention for pressure compensation cells using organic (non-aqueous) electrolytes such as thionyl chloride (density 1.655 $g/cm^3$) which are used in certain lithium ion primary batteries. They are also deemed useful in pressure compensation of cells using solid electrolytes such as those made by Ultralife Batteries, Inc. of Newark, N.Y., since they do not tend to attack battery components such as the solid electrolyte. These compounds are generally nontoxic, or much less toxic than equivalent chlorinated hydrocarbons, and, if sufficiently non-volatile, are also environmentally friendly. Some of these lower boiling fluorinated carbon compounds are used in air-conditioning units.

For cells which operate at room temperature and above, the preferred pressure-compensation fluid of the invention is designated FS-1265 fluid which is a fluorosilicone manufactured by Dow Corning. This fluid has the following almost ideal properties for application in the invention.

Referring to the preferred properties previously outlined, the FS-1265 fluid when used as a battery pressure-compensation fluid according to the invention will exhibit the following properties:

1. A density of 1.25 g/cm$^3$ at 25° C. which is, therefore, highly suitable. The density may be reduced as desired by mixing with a suitable Dow Corning DC 702 diffusion pump fluid, or increased by adding a small amount of denser fluid such as tetra-chloroethylene.

2. Non-ionic, non-conductive.

3. Non-reactive in strong non-oxidizing bases such as KOH.

4. Non-reactive in strong non-oxidizing acids such as $H_2SO_4$.

5. Non-reactive under conditions presented by most battery chemistries.

6. Extremely non-volatile, losing only 2% weight after four hours at 200° C.

7. Insoluble and immiscible in water.

8. Insoluble in common battery electrolytes.

9. Low freezing point at less than −48° C.

10. Compatible with most elastomers, i.e. Viton, Teflon, Delvin, Propylene, Nylon, Phenolic Laminate, Silasatic rubber, Neoprene.

11. Stable and non-reactive under most conditions.

12. Non-toxic, non-flammable, non-corrosive, environmentally friendly.

13. Gas solubility unknown. Used for gas-liquid separation.

14. Non-foaming, used as an antifoaming agent.

15. Low flammability, flash point 260° C.

TABLE I

| Compound | Density (g/cm$^3$) | Melting or Pour Point (°C.) | Boiling Point (°C.) | Flash Point (°F.) | Viscosity (CST) |
|---|---|---|---|---|---|
| CHLORINATED HYDROCARBONS | | | | | |
| 1,1,1,3,3,3-Hexachloropropane | 1.68 | −27 | 206 | 206 | Low |
| 1,2,2,3-Tetra-chlorobutane | 1.426 | −48 | 182 | 140 | Low |
| Tetra-chloroethylene | 1.623 | −22.18 | 121 | None | Low |
| α-Chloronaphthalene | 1.1938 | −20 | 259 | 121 | Low |
| FLUOROCARBON POLYMERS | | | | | |
| Perfluoro-polyether (Fomblin 16/6 of Ausimont/Montedison of Italy) | 1.89 | −44 | >270 | None | 60 |
| Trifluoropropyl- methyl Polysiloxane (FS1265 of Dow Corning Corporation) | 1.25 | −48 | 288 | 260 | 300 |
| Flurolube FS-5 of Occidental Chemical Co. of Dallas, TX | 1.865 | −60 | 300 | None | 6.0 |
| DENSITY ADJUSTERS | | | | | |
| Synthetic Organic Hindered Ester Mixture (Apiezon AP301 of M&I of England) | 0.965 | −40 | 227 | 260 | 23.7 |
| Organo-Silicon Oxide-Polymer (DC702 of Dow Corning Corporation) | 1.07 | −20 | 191 | 193 | 55 |
| Mixture of Dow Corning DC 702 and Tetra-chlooethylene (Mixture 4:1) | 1.20 | <−20 | <191 | 193 | <55 |
| Mixture Apiezon AP301 and Tetra-chloroethylene (Mixture 1:1) | 1.29 | <−20 | <227 | >260 | <24 |

For applications which require operation at low temperature, such as manned or un-manned submarines in the ocean, the preferred pressure-compensation fluid according to the invention is a mixture of two fluids (1) Dow Corning DC-702 diffusion pump fluid manufactured by Dow Corning, which is an organo-silicon oxide polymer having a density of 1.07 g/cm$^3$, and (2) tetra-chloroethylene having a density of 1.60 g/cm$^3$ and commonly used as a cleaning or laundering fluid. These two fluids are extremely hydrophobic, non-conductive, non-flammable, non-reactive and have low volatility when mixed. Mixed in various proportions, the density can be adjusted from 1.07 g/cm$^3$ to 1.60 g/cm$^3$. Mixed in a proportion by volume of 20% tetra-chloroethylene and 80% Dow Corning DC-702, a density of approximately 1.2 g/cm$^3$ is obtained, which is very close to the optimum for a battery using an aqueous solution of KOH at a density near 1.4 g/cm$^3$. The viscosity of this mixture is relatively low permitting evolved bubbles to rise rapidly toward the pressure relief valve where they may be expelled. The Dow Corning DC-702 fluid has a pour point of −20° C. and a viscosity of 55 centistokes (CST) at 20° C. Using the guidelines set forth, other candidates may be found in the physical chemistry archives.

For lead acid batteries, the density of the $H_2SO_4$ electrolyte employed varies from about 1.2 g/cm$^3$ or 1.3 g/cm$^3$ for a fully charged battery, to 1.1 g/cm$^3$ or less for a discharged battery. These densities are not reliably high enough to ensure separation from ambient water by a fluid of intermediate density. One possibility to increase the utility of the invention herein for use with lead acid batteries is to increase the acid concentration of the $H_2SO_4$ electrolyte from the 30% usually employed, to 50% or more, if this does not interfere with the desired battery operation. A solution of 50% $H_2SO_4$ has a density of 1.4 g/cm$^3$. The effect of this change in electrolyte on the battery operation is unexplored at this time.

Another class of lead acid battery is the previously mentioned and so-called "starved electrolyte" type in which a minimum quantity of electrolyte is captured, generally in a fiberglass wick. This type of battery has a reputation of being more robust in terms of recovery from deep discharge, and from being left uncharged, than the more conventional free liquid electrolyte type battery. The starved electrolyte type battery may be pressure-compensated using fluids similar to those mentioned above, if the affinity of the electrolyte for the fiberglass wick is great enough. Preferably, for this type battery, a pressure-compensation fluid is used which, according to the invention, has a density which prevents water intrusion and prevents the electrolyte from floating out of the wick. Since the force of gravity is not sufficient to cause the electrolyte to descend in the wick and pool in the bottom of these batteries, and inverting them does not cause pooling in the top, a pressure-compensation fluid which produces a net vertical buoyant force equal to the force of gravity does not cause the electrolyte to float. The maximum pressure-compensation fluid density resulting in a net buoyant force equal to one negative gravity would be 2.05 g/cm$^3$ for the case of a deeply discharged lead acid battery. A pressure-compensation fluid below the referred to maximum-pressure compensation fluid density would thus fall into the density range of the fluorocarbon polymers mentioned previously. These fluids when used as a pressure-compensation fluid for purposes of the invention also have a poor affinity for wet fiberglass and would thus not tend to be absorbed into the wick. Alternatively, the electrolyte density might be increased as discussed above.

The battery of the invention preferably includes pressure relief valve 62 (shown in FIGS. 3 and 3A), which allows the battery to vent evolved gas during charging or expanding gas bubbles during decompression (ascent). Such a relief valve must also allow the gas to vent when sufficient overpressure occurs, but prevent loss of the pressure-compensation fluid if the battery is inverted. Inversion protection is essential for these kinds of batteries, particularly when used with small submarines, which may assume any attitude during deployment or in rough seas. A schematic view of valve 62 is shown in FIGS. 4 and 4A.

Valve 62 as illustrated consists of a ball and spring relief valve well known in the art (as shown in detail in FIG. 4 and 4A), or for further simplicity may consist of a precise spring clamp (not shown) which acts to pinch the outlet tubing with an accurately controlled pressure. Overpressure in cell 50 (FIGS. 3, 3A) acting against ball 74 and spring 72 opens valve 62 and releases the pressure inside cell 50 (FIGS. 3, 3A) through vent 70. When no pressure is exerted against ball 74, spring 72 seals ball 74 in valve 62. Gravimetric separation of the electrolyte, the preferred pressure-compensation fluid and gas will allow only evolved gas to escape. Alternatively, valve 62 may comprise a gas permeable membrane stretched across an opening which releases gas when a particular pressure is reached. The actual structure of a particular valve may be configured as is known by one of skill in the art depending on the size of battery, and whether valve 62 is used for a single cell battery or a battery including series of cells.

Figure 3A:
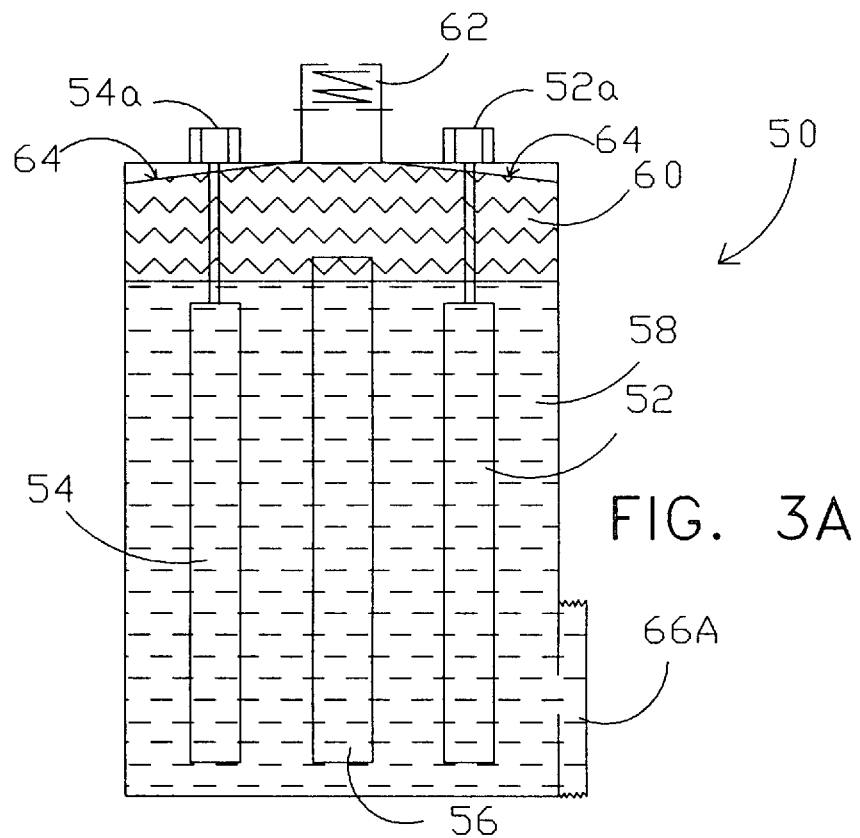
FIG. 3A is a schematic drawing of an alternative embodiment of the invention shown in FIG. 3 and having a volume compensation system.
Figure 4:
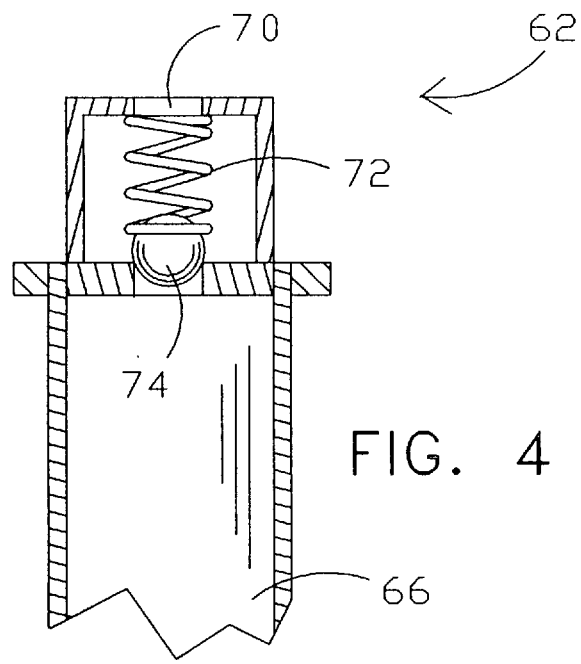
FIG. 4 is an enlarged fragmentary schematic diagram of a combination pressure relief valve and volume compensation system that may be used with the invention.
Figure 4A:
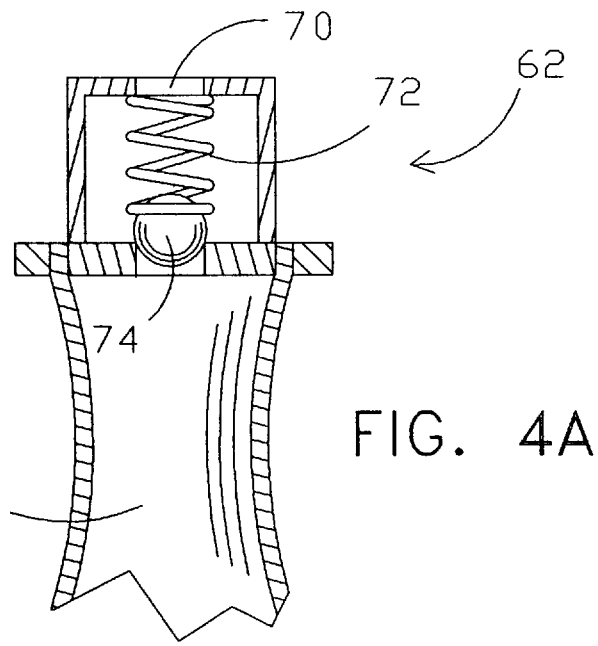
FIG. 4A is an enlarged fragmentary schematic diagram of the pressure relief valve of FIG. 4 showing the distensible tube of the valve responding to increased ambient pressure.

Volume compensation may be incorporated into the pressure valve preferably as distensible tube 66 (FIGS. 3, 4 and 4A), or alternatively as a separate component such as bellows 66A (as shown in FIG. 3A), to allow the expansion of gas bubbles which have not yet made their way to the pressure relief valve outlet. This volume compensation offered by distensible tube 66, or bellows 66A prevents damage during recompression if significant compensation fluid is lost, or if volume changes occur in battery 50 components due to changes in temperature, ambient pressure, or swelling of battery 50 components. FIG. 4A illustrates distensible tube 66 in a compressed state.

Distensible tube 66 is constructed of materials compatible with the cell electrolyte 58, pressure-compensation fluid 60, and the ambient water (not shown). Examples of tubing suited to the invention and which are readily available include flexible polyvinylchloride (PVC), Tygon™ vinyl, Tygothane™ vinyl and flexible polycarbonate tubing. The bellows 66A also serves to compensate volume and may be constructed of similar materials.

Because of the high energy density of silver zinc, nickel cadmium, lithium ion, and other type batteries suited to pressure compensation, the possibility is recognized in a laboratory setting of operating such a pressure-compensated battery under water to provide for absorption of heat and other energy in the event of a catastrophic failure of a battery. The pressure-compensation system of the invention as described herein is highly adapted to such operation and represents a significant safety advance in the use of a high-energy battery.

In other applications employing rechargeable high energy batteries at atmospheric pressure, it may be desirable to operate them within a water jacket for safety reasons. Accidental failure or abuse of the battery such as in an accident with an electric automobile could result in evolution of considerable heat from the battery. The water would serve to cushion the shock, absorb the heat energy, and dilute any spilled chemicals.

Because certain types of batteries such as the silver-zinc type require physical restraint to prevent cell expansion and failure during charge and other circumstances, the batteries are normally pressed together in a cluster and constrained physically by a surrounding structure formed to the shape of the cell cluster.

Figure 5:
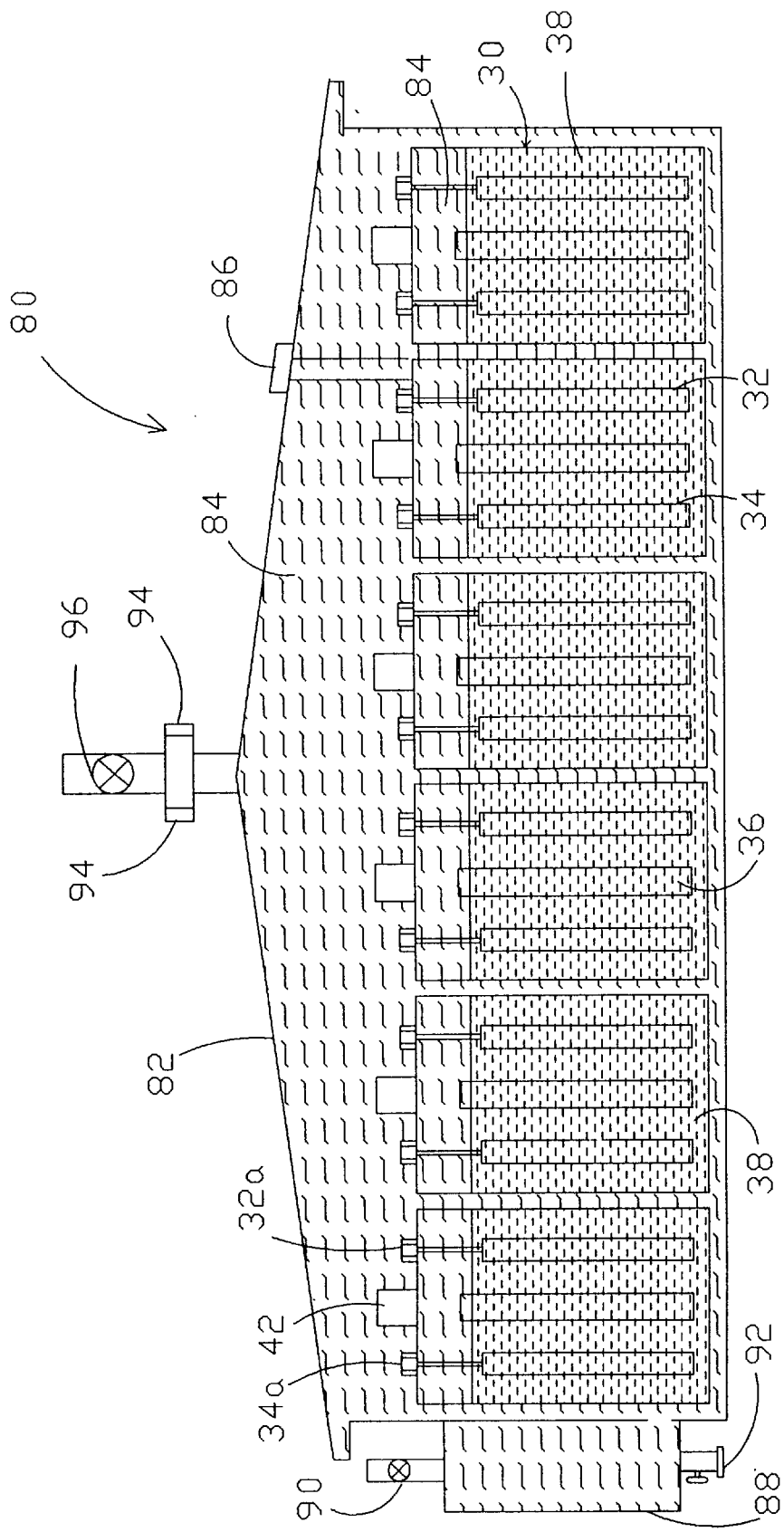
FIG. 5 is a schematic drawing of a prior art multiple cell pressure compensation battery system.

A typical prior art multiple-cell pressure-compensated battery 80 is shown schematically in FIG. 5. Battery 80 comprises a plurality of individual cells 30, each having an anode 32, corresponding terminal 32(*a*), cathode 34, corresponding terminal 34(*a*), and separator 36 in electrolyte 38, and a pressure release valve 42. The plurality of cells 30 are contained within housing 82 which is filled with a pressure-compensation fluid 84. Housing 82 has volume compensator 88 to accommodate volume changes in cells 30 within housing 82. Volume compensator 88 has fill 90 for introducing pressure-compensation fluid into housing 82, and drain 92 to drain pressure-compensation fluid 84 from housing 82. Housing 82 also has power receptacle 86 and pressure relief valve 94, and vent 96 to allow gas to escape from housing 82 while preventing ambient water from entering battery 80.

Figure 6:
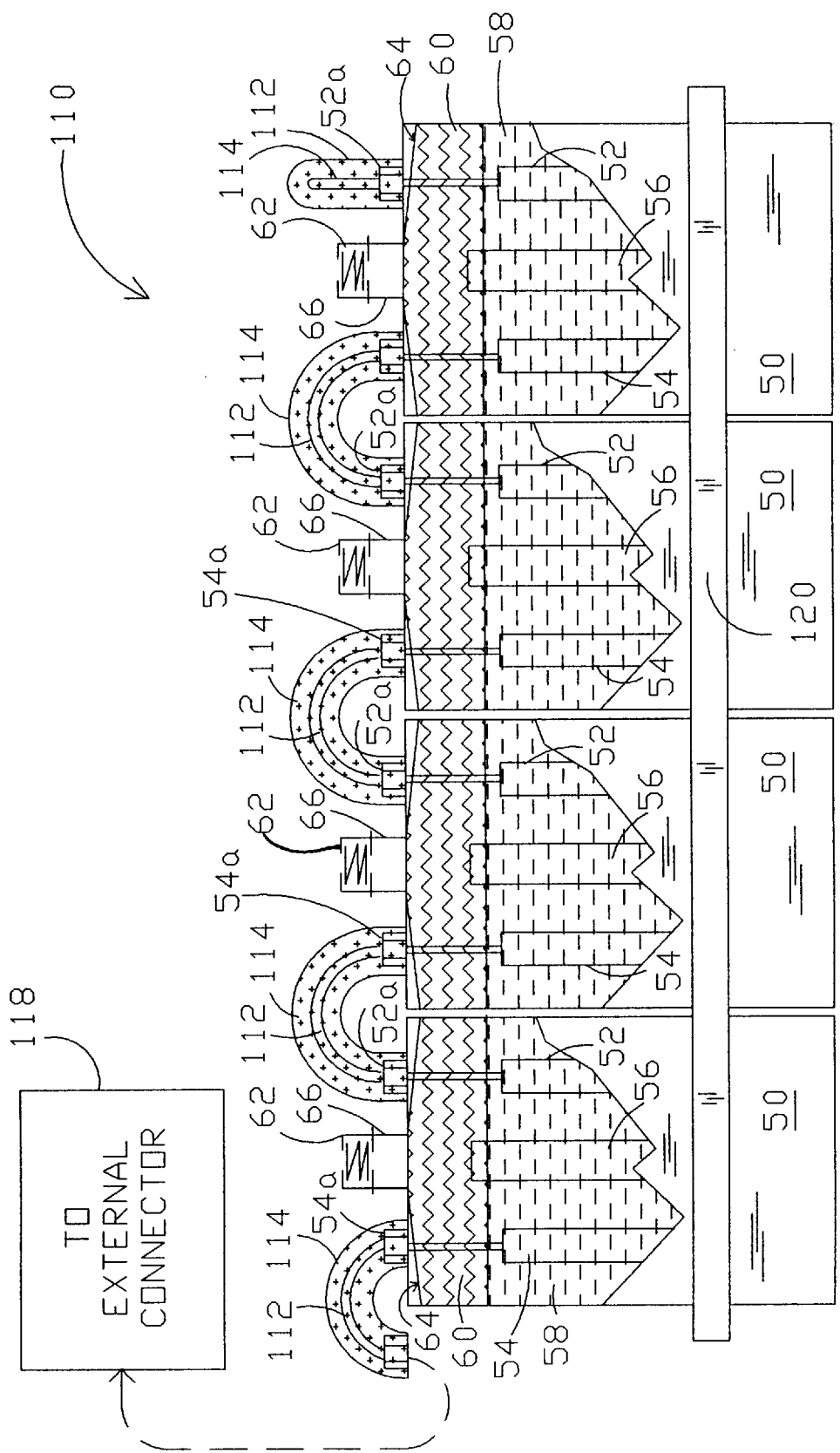
FIG. 6 is a schematic drawing of a multiple cell battery of the invention.

The cells 50 of the invention are compatible for use in a multiple-cell pressure-compensated battery, shown as battery 110 in FIGS. 6 and 7. The cells 50 are interconnected by means of interconnect wires 112 and are connected to external connector 118. Unlike typical cells however, the cells of the invention battery 110 utilize fluid-filled tubes 114 to surround wires 112 to protect them from ambient conditions. Preferably fluid-filled tubes 114 are filled with a non-reactive fluid which protects wires 112, such as light mineral oil or the preferred pressure compensation fluid. In this manner, battery 110 need not be housed in a casing and can be exposed to seawater during use. Because each cell 50 is equipped with a pressure relief valve 62 and a volume compensation like distensible tube 66, each cell can operate effectively during use, recharging and ascent in underwater conditions. Battery 110 is also suitable for placement in a housing surrounded by a pressure-compensation fluid, as shown for the prior art cells in FIG. 5; however, this arrangement is not necessary for the operation, or recharging of the battery.

Battery expansion restraint 120, shown in FIGS. 6 and 7, serves to restrain cells 50 when expansion occurs during use. Restraint 120 also serves through integrally molded separator bands 120a to separate cells 50 to allow heat to freely flow between cells 50, effectively equalizing cell 50 temperatures. This arrangement results in more reliable cell operation, minimization of the likelihood of heat build-up in the battery interior, and decreases the need to measure the individual cell 50 temperature to customize the charging regimen for each cell 50. The multiple-cell battery 110 can be placed in a tray 122, not shown, to provide further support for the battery 110.

As previously noted, the battery of the invention can generally be made in the same way as a typical battery, but with the chosen pressure-compensation fluid 60 layered on top of the cell electrolyte 58 as depicted in FIG. 6. Fluid 60 is best added after cell electrolyte 58 is added, and after the individual cell 50 has been electrically activated. It is essential that the battery anode 52 and cathode 54 be wetted thoroughly with electrolyte 58 before pressure-compensation fluid 60 is added. The electro-forming of the electrodes 52 and 54 frequently results in an expansion of electrolyte 58 so pressure-compensation fluid 60 should not be added until this electrolyte volume has stabilized.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A battery for use underwater at a pressure at or greater than atmospheric pressure, and having an anode, a cathode, and an associated electrolyte in a housing, further comprising a pressure-compensation fluid selected from the group consisting of perfluoropolyether, trifluoropropylmethyl polysiloxane, and chlorinated fluorocarbon polymers which pressure-compensation fluid is floated on said electrolyte and has a density between the density of the water in which the cell is being used and the density of the electrolyte.

2. The battery of claim 1, wherein the pressure-compensation fluid has a density of about 1.2 g/cm$^3$.

3. The battery of claim 1, wherein the pressure-compensation fluid is non-conductive.

4. The battery of claim 1, wherein the pressure-compensation fluid is stable in non-oxidizing bases, and the electrolyte is an alkali.

5. The battery of claim 1, wherein the pressure-compensation fluid is stable in non-oxidizing acids, and the electrolyte comprises H$_2$SO$_4$.

6. The battery of claim 1, wherein the pressure-compensation fluid has a boiling point of 200° C. or greater and has a melting point of −10° C. or lower.

7. The battery of claim 1, wherein the pressure-compensation fluid is insoluble and immiscible in both water and said electrolyte.

8. The battery of claim 1, wherein the pressure-compensation fluid is non-conductive, has a boiling point of 200° C. or greater and has a melting point of −10° C. or lower, and is insoluble and immiscible in both water and said electrolyte.

9. The battery of claim 1, wherein the pressure-compensation fluid is selected from the group consisting of chlorinated hydrocarbons and fluorocarbon polymers.

10. The battery of claim 9, wherein the pressure-compensation fluid is a chlorinated hydrocarbon selected from the group consisting of 1,1,1,3,3,3-hexachloropropane, 1,2,2,3-tetrachlorobutane, tetrachloroethylene and α-chloronaphthalene.

11. The battery of claim 8, wherein the pressure-compensation fluid consists of a mixture of a silicone oil and a fluid of greater density.

12. The battery of claim 11, wherein the greater density fluid is tetrachloroethylene.

13. The battery of claim 8, wherein the pressure-compensation fluid consists of a mixture of synthetic organic hindered ester mixture and a fluid of greater density.

14. The battery of claims 13, wherein the greater density fluid is tetrachloroethylene.

15. The battery of claim 1, wherein the pressure compensation fluid is a mixture of silicone oil having a density of about 1.07 g/cm$^3$ and tetrachloroethylene having a density of about 1.60 g/cm$^3$.

16. The battery of claim 10, wherein the pressure compensation fluid is a mixture of the selected chlorinated hydrocarbon and light mineral oil, said mixture having a density of about 1.2 g/cm$^3$.

17. The battery of claim 16, wherein the mixture comprises 20% tetrachloroethylene and 80% silicone oil by volume, the mixture having a density of about 1.2 g/cm$^3$.

18. A multi-cell battery array containing a plurality of the batteries of claim 1.

19. The battery array of claim 18, further comprising additional compensation fluid between the electrochemical cells.

20. The battery of claim 1, further comprising volume compensation means.

21. The battery of claim 20 wherein the volume compensation means comprises a distensible tube connected in fluid communication with said housing.

22. The battery of claim 20 wherein the volume compensation means comprises a bellows connected in fluid communication with said housing.

23. A method of making a battery for use underwater at a pressure at or greater than atmospheric pressure and having a cell containing an anode, a cathode, and an associated electrolyte in a housing, comprising the step of adding a pressure-compensation fluid in said housing above said electrolyte which pressure-compensation fluid is selected from the group consisting of perfluoropolyether, trifluoropropylmethyl polysiloxane, and chlorinated fluorocarbon polymers and has a density between the density of the water in which the battery is being used and the density of the electrolyte.

24. The method of claim 23, wherein the pressure-compensation fluid has a density of about 1.2 g/cm³.

25. The method of claim 24, wherein the pressure-compensation fluid is non-reactive with a corrosive electrolyte.

26. The method of claim 23, further comprising the step of mixing a chlorinated hydrocarbon with a mineral oil to achieve a density of about 1.2 g/cm³ for said pressure-compensation fluid.

27. The method of claim 23, further comprising the step of mixing a chlorinated hydrocarbon with a silicone oil to achieve a density of about 1.2 g/cm³ for said pressure-compensation fluid.

* * * * *